United States Patent
Zamani et al.

(10) Patent No.: US 11,449,877 B2
(45) Date of Patent: *Sep. 20, 2022

(54) LEAD MARKETPLACE SYSTEM AND METHOD WITH LEAD AUCTIONS

(71) Applicant: One Planet Ops Inc., Walnut Creek, CA (US)

(72) Inventors: Payam Zamani, Danville, CA (US); William J. Brown, San Francisco, CA (US); Ernest Rodrigues, Jr., San Jose, CA (US)

(73) Assignee: One Planet Ops Inc., Walnut Creek, CA (US)

( * ) Notice: Subject to any disclaimer, the term of this patent is extended or adjusted under 35 U.S.C. 154(b) by 952 days.

This patent is subject to a terminal disclaimer.

(21) Appl. No.: 15/489,547

(22) Filed: Apr. 17, 2017

(65) Prior Publication Data

US 2017/0221077 A1    Aug. 3, 2017

Related U.S. Application Data

(63) Continuation of application No. 12/061,547, filed on Apr. 2, 2008, now Pat. No. 9,626,718, and a continuation of application No. 13/037,177, filed on Feb. 28, 2011.

(60) Provisional application No. 60/958,884, filed on Jul. 9, 2007, provisional application No. 61/021,292, filed on Jan. 15, 2008.

(51) Int. Cl.
| | |
|---|---|
| *G06Q 30/00* | (2012.01) |
| *G06Q 30/02* | (2012.01) |
| *G06Q 10/06* | (2012.01) |
| *G06Q 30/06* | (2012.01) |
| *G06Q 30/08* | (2012.01) |

(52) U.S. Cl.
CPC ......... *G06Q 30/02* (2013.01); *G06Q 10/0637* (2013.01); *G06Q 30/0201* (2013.01); *G06Q 30/0601* (2013.01); *G06Q 30/0641* (2013.01); *G06Q 30/08* (2013.01)

(58) Field of Classification Search
CPC .......................... G06Q 10/0637; G06Q 30/02
USPC .......................................................... 705/10
See application file for complete search history.

(56) References Cited

U.S. PATENT DOCUMENTS

| | | | |
|---|---|---|---|
| 5,883,940 | A | 3/1999 | Thornton |
| 6,092,074 | A | 7/2000 | Rodkin et al. |
| 6,324,519 | B1 | 11/2001 | Eldering |
| 6,718,312 | B1 | 4/2004 | McAfee et al. |
| 6,804,659 | B1 | 10/2004 | Graham et al. |
| 6,826,572 | B2 | 11/2004 | Colace et al. |
| 6,859,833 | B2 | 2/2005 | Kirsch et al. |
| 6,868,389 | B1 | 3/2005 | Wilkins et al. |

(Continued)

FOREIGN PATENT DOCUMENTS

| | | |
|---|---|---|
| WO | WO 0129720 | 4/2001 |
| WO | WO 2008031625 | 3/2008 |

OTHER PUBLICATIONS

PCT/US08/08393, International Search Report and Written Opinion dated Sep. 19, 2008 (10 pgs.).

(Continued)

*Primary Examiner* — Rokib Masud
(74) *Attorney, Agent, or Firm* — DLA Piper LLP US

(57) ABSTRACT

A lead marketplace system and method are provided. The lead marketplace system and method provides an auction for leads.

10 Claims, 12 Drawing Sheets

(56) References Cited

U.S. PATENT DOCUMENTS

| | | |
|---|---|---|
| 7,136,875 B2 | 11/2006 | Anderson et al. |
| 7,299,195 B1 | 11/2007 | Tawakol et al. |
| 7,319,975 B2 | 1/2008 | Monteverde |
| 7,899,715 B2 | 3/2011 | Zamani |
| 9,626,718 B2 | 4/2017 | Zamani et al. |
| 9,665,629 B2 | 5/2017 | Kindiq |
| 2002/0055906 A1 | 5/2002 | Katz |
| 2002/0128959 A1 | 9/2002 | Kostic et al. |
| 2002/0194050 A1 | 12/2002 | Nabe et al. |
| 2003/0195837 A1 | 10/2003 | Kostic et al. |
| 2004/0088241 A1 | 5/2004 | Rebane et al. |
| 2004/0143473 A1* | 7/2004 | Tivey .................... G06Q 30/02 705/1.1 |
| 2005/0097204 A1 | 5/2005 | Horowitz et al. |
| 2005/0149395 A1 | 7/2005 | Henkin et al. |
| 2005/0273423 A1 | 12/2005 | Kiai et al. |
| 2006/0041500 A1 | 2/2006 | Diana et al. |
| 2006/0122879 A1 | 6/2006 | O'Kelley |
| 2006/0195385 A1 | 8/2006 | Khetrapal et al. |
| 2006/0200360 A1* | 9/2006 | Razletovskiy ......... G06Q 40/04 705/37 |
| 2006/0259455 A1 | 11/2006 | Anderson et al. |
| 2006/0271389 A1 | 11/2006 | Goodman |
| 2007/0185779 A1 | 1/2007 | O'Kelley |
| 2007/0027754 A1 | 2/2007 | Collins et al. |
| 2007/0061211 A1 | 3/2007 | Ramer et al. |
| 2007/0088727 A1 | 4/2007 | Kindig |
| 2007/0089057 A1 | 4/2007 | Kindig |
| 2007/0179856 A1 | 8/2007 | O'Kelley |
| 2007/0192217 A1 | 8/2007 | O'Kelley et al. |
| 2007/0192246 A1 | 8/2007 | Futamase |
| 2007/0198350 A1 | 8/2007 | O'Kelley et al. |
| 2007/0214045 A1 | 9/2007 | Subramanian et al. |
| 2007/0260518 A1 | 11/2007 | Ronen et al. |
| 2007/0282904 A1 | 12/2007 | Mitchell |
| 2008/0016109 A1 | 1/2008 | Henkin et al. |
| 2008/0031625 A1 | 2/2008 | Okuda et al. |
| 2008/0040221 A1 | 2/2008 | Wiseman et al. |
| 2008/0046415 A1 | 2/2008 | Henkin et al. |
| 2008/0189408 A1 | 8/2008 | Cancel et al. |
| 2008/0201188 A1 | 8/2008 | Heyman et al. |
| 2008/0221982 A1 | 9/2008 | Harkins et al. |
| 2008/0255921 A1 | 10/2008 | Flake et al. |
| 2009/0006520 A1 | 1/2009 | Abib |
| 2009/0018894 A1 | 1/2009 | Zamani et al. |
| 2012/0030054 A1 | 2/2012 | Zamani |

OTHER PUBLICATIONS

Event Transcript, *eBay Analyst Day—Final*, Anonymous; Fair Disclosure Wire, May 4, 2006 (84 pgs.).

Showalter, K. (2000). *The internet becomes an important selling tool for automobile dealerships in central Ohio*, Business First, 16(22),1 (4 pgs.).

* cited by examiner

LEAD MARKETPLACE SYSTEM AND METHOD WITH LEAD AUCTIONS

PRIORITY CLAIM/RELATED APPLICATIONS

This application claims priority under 35 USC 120 to U.S. patent application Ser. No. 12/061,547 filed Apr. 2, 2008 and Ser. No. 13/037,177 filed Feb. 28, 2011 that in turn claims the benefit under 35 USC 119(e) and priority under 35 USC 120 to U.S. Provisional Patent Application Ser. Nos. 60/958,884 filed on Jul. 9, 2007 and entitled "System for Implementing an Open Auction Marketplace for Opt-in Consumer Leads, and 61/021,292 filed on Jan. 15, 2008 and entitled "Lead Marketplace System and Method", all of which are incorporated herein by reference.

This application is also related to U.S. Pat. No. 7,899,715 issued Mar. 1, 2011 (filed as U.S. application Ser. No. 12/061,615 filed on Mar. 2, 2008) and entitled "Lead Marketplace System and Method with Ping Campaigns" and Ser. No. 12/061,618 filed on Apr. 2, 2008 and entitled "Lead Marketplace System and Method with Ratings System".

FIELD

The system and method relate to a lead marketplace system and method that may be used for various different types of leads.

BACKGROUND

One of the many uses of the Internet is to connect customers who are contemplating a transaction with one or more service providers who want to compete for their business. A Lead consists of contact information and other information about a transaction that a customer is interested in, collected from a customer who has requested information about a possible transaction or has asked to be put in touch with a Service Provider. Leads are fungible products that are sold to one or more Service Providers ("Lead Buyers"). Leads are not purchase requests per se, rather they consist of the information necessary for a Service Provider to contact a customer in an effort to acquire the customer's business.

Today, it is difficult to efficiently price and distribute Leads as there is a great amount of variability amongst Lead Buyers in the value they place on a Lead based on local market factors, characteristics of the customer, time of month, and their current ability to service the business. In one market for Leads, there may be 100,000 Lead Buyers spread across the country. If a company that captures, or "Generates" Leads sets prices for the Leads, either on a per-lead basis or through a subscription, this pricing will not reflect the value of each individual Lead to the buyer. The impact of this disparity between price and value to the buyer results in two things: 1) Leads that are overpriced that do not sell; and 2) Leads that are underpriced that sell at less than the optimal price. So, Lead Generators are faced with a situation where they generate no revenue from overpriced Leads while not generating as much money as they could from underpriced Leads.

Thus, it is desirable to provide a lead marketplace system and method that overcomes these problems of conventional systems and it is to this end that the system and method are directed.

DETAILED DESCRIPTION OF ONE OR MORE EMBODIMENTS

The system and method are particularly applicable to a Web-based lead marketplace system and method and it is in this context that the system and method will be described. It will be appreciated, however, that the system and method has greater utility since it may be implemented in different manners, may be based on different architectures and is not limited to the particular types of leads described below. In particular, the lead marketplace system and method may be used to buy and sell various types of leads including leads for goods purchases or leads for services.

Figure 1:
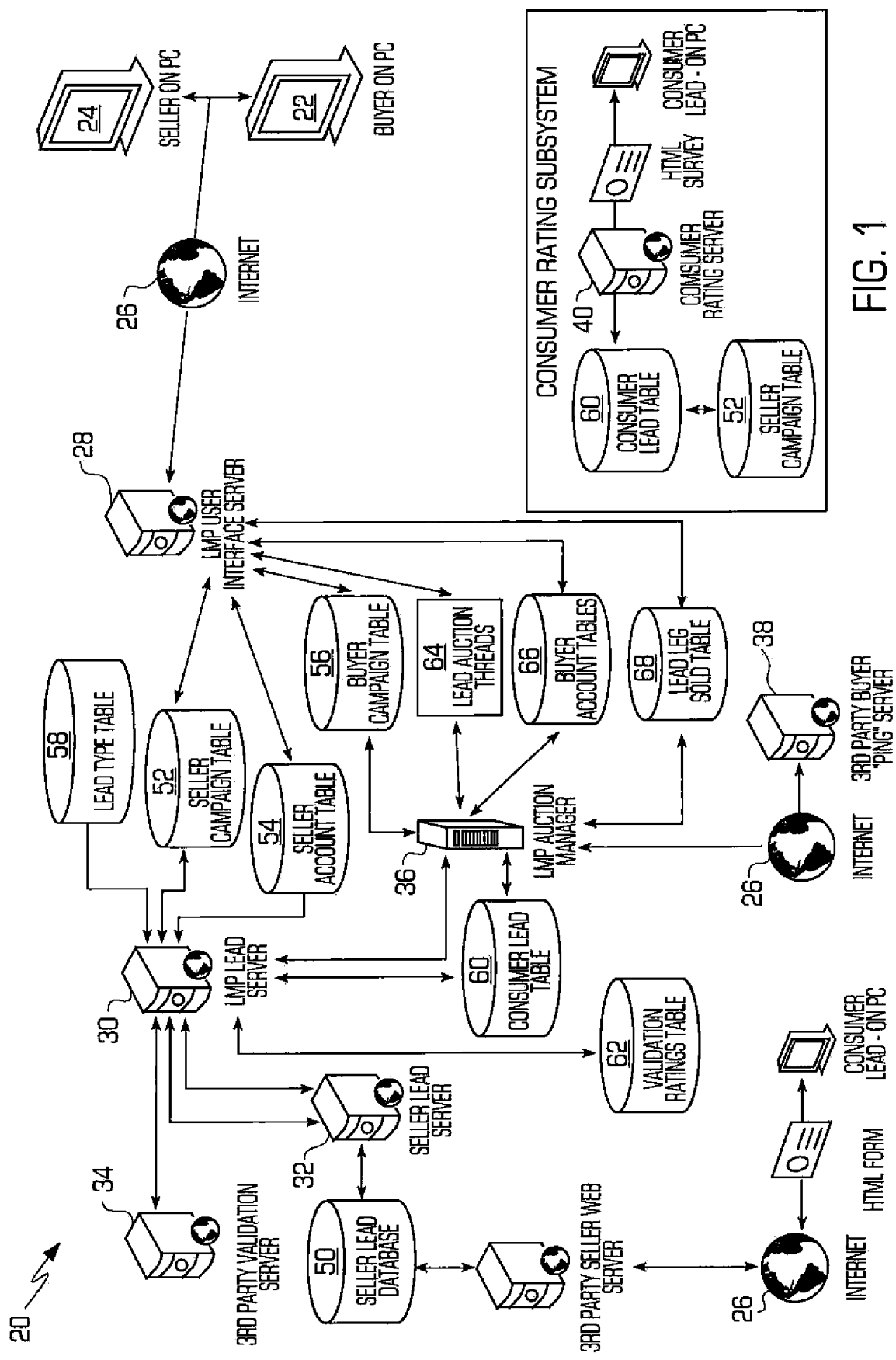
FIG. 1 illustrates an example of a computer system Web-based implementation of a lead marketplace system.

FIG. 1 illustrates an example of a computer system Web-based implementation of a lead marketplace (LMP) system 20. The lead marketplace system brings Lead Buyers (Lead Buyers) 22 and Lead Sellers (Lead Sellers) 24 together in a way that efficiently prices Leads so that they sell at the market-efficient price while minimizing the Lead Seller's operating costs. The Leads may include any type of leads including, but not limited to, consumer leads business to business leads. The Lead Buyer and Lead Seller may be coupled to the LMP system over a link 26, such as the Internet or any other communications or computer network whether wired or wireless, to a LMP user interface unit 28, such as a server computer in one embodiment, that executes computer code to generate and provide the user interfaces to the Lead Buyer 22 and Lead Seller 22 who each access the LMP system 20 using a computing device that executes a browser application that displays Web pages to the Lead Buyer and the Lead Seller. Each computing device may be a processing unit based device with sufficient processing power, memory and connectivity to interact with the LMP system as described below wherein each computing device may be, for example, a personal computer, a laptop computer, a smart telephone, a terminal, a mobile phone, a wireless email device, etc.

A lead is a set of information about a customer who may purchase a product or service wherein the lead can be generated in various different manners. For example, a lead (including Lead which is contact and transaction information that might lead to the acquisition of a customer for a product or service) may be a person who is looking for a plumber in the Reno, Nev. area to perform a particular task, a person looking for a mortgage of $500,000 with a 520 credit rating and living in Livermore, or a person who wants to purchase a new Mazda RX-8 in the Boston area who is willing to spend $X. Each of these is a different type of lead and the LMP system can be used with any type of lead.

A Lead Buyer is an entity (individual, corporation, etc) who is willing to pay a certain price for a quantity of a particular type of lead for a particular good or service. Examples of Lead Buyers are a mortgage broker who is willing to pay for leads for people looking for mortgages in a certain geographic area or a plumber who is willing to pay for leads to people nationally who need to have their houses re-piped. Each Lead Buyer may have one or more buyer campaigns wherein each buyer campaign provides the parameters of the leads desired (such as the types of the leads, the number of leads, time period for the leads, the budget for the leads over the time period, geographic area, etc.) that are of interest to the Lead Buyer. A Lead Seller is an entity (individual, corporation, etc) who wants to sell a particular type of lead for a particular good or service, such as a company that runs a mortgage advice Website and collects mortgage leads. Each Lead Seller may have one or more seller campaigns wherein each seller campaign provides a means of grouping and tracking particular leads over time for the purpose of attributing leads to the appropriate Lead Seller and tracking the quality of the leads sold.

The LMP system 20 may further comprise an LMP lead unit 30, such as one or more server computers that execute computer code in one implementation, that accepts and stores new leads, an LMP auction manager 36, such as one or more server computers that execute computer code in one implementation, that perform the auctioning process of the LMP system as described below in more detail. The LMP system may communicate with a seller lead unit 32, such as one or more server computers that execute computer code in one implementation, that interfaces with and stores third party leads to be sold, a third party validation unit 34, such as one or more server computers that execute computer code in one implementation, that validates third party leads, and a third party buyer ping unit 38, such as one or more server computers that execute computer code in one implementation, that implements a ping campaign as is described below in more detail. The LMP system 20 may further comprise a consumer rating unit 40, such as one or more server computers that execute computer code in one implementation, that provide a rating process of the LMP system as described in more detail below.

The LMP system 20 may further include one or more storage units, such as database tables in one implementation of the system that store data and are accessed by the various units of the system as described above. The system 20 may thus comprise a seller lead database 50 that stores third party seller leads and interacts with the lead unit 30, a seller campaign table 52 that stores a plurality of Lead Seller campaigns for a plurality of Lead Sellers in the LMP system as described below and a seller account table 54 that stores account information about each seller in the LMP system. In one embodiment, the seller account table may include an Object ID field, Identification Fields, a Login field, a Password field, and Payment Information fields and the seller campaign table may include an Object ID field, a Seller ID field, a User Defined Name field, a Collection Method field and a Quality Rating field. The Lead Seller campaigns enable the Lead Sellers to track the performance of different variations of Leads generated using different methods.

The LMP system may further comprise a buyer campaign table 56 that stores a plurality of Lead Buyer campaigns for a plurality of Lead Buyers in the LMP system as described below and a lead type table 58 that stores the different types of leads (such as mortgages, plumbers, autos, etc.) and the characteristics, or filters, for the different types of leads (such as mortgage amount, property type and house location for the mortgage leads or house location and type of plumbing work for a plumbers leads, or automobile make and model for automobile leads). In one embodiment, the lead type table may include an Object ID field, a Name field, a Sharing Allowed field, and XML Schema (Field 1, Field 2, Field3 . . . ) fields, and the buyer campaign table may include an Object ID field, a Buyer ID field, a User Defined Name field, a Lead Type field, Location Fields, a Max Age field, a Min Quality field, Type-Specific Filter Fields, Bid Amount field and Sharing Level field(s), an Activity Status field, a Bid Type field, a Ping Type field and a Ping URL field.

The LMP system 20 may further include a Lead table 60 that interfaces with the LMP lead unit 30 and the LMP auction manager 36 and stores information about each Lead in the LMP system and a validating ratings table 62 that interfaces with the LMP lead unit 30 and stores information about the validating ratings of the leads. In one embodiment, the Lead table may include an Object ID field, a Ping ID field, a Seller Campaign ID field, an Auction Thread ID field, a Lead Type field, Consumer Contact Information fields, a Generated Timestamp field, an Actual Payout field and a Sold Timestamp field. The LMP system 20 may further comprise one or more lead auction threads 64 wherein a lead auction thread is created for each lead as described below in more detail. The LMP system 20 may further comprise a buyer account table 66 that interfaces with the LMP auction manager 36 and stores information about each of the Lead Buyers in the LMP system and a lead leg sold table 68 that interfaces with the LMP auction manager 36 and stores information about the leads that are sold in the LMP system to each individual Lead Buyer. In one embodiment, the buyer account table may include an Object ID field, Identification Fields, a Login field, a Password field and Billing Information fields, and the lead leg sold table may include an Object ID field, a Lead ID field, a Buyer Campaign ID field, a Lead Type field, Consumer Contact Information fields, a Generated Timestamp field, a Price Paid field and a Bought Timestamp field.

In addition to the tables shown in FIG. 1, the LMP system 20 further may include a number of other tables including a lead ping table, a lead post table, a buyer campaign ping table, a budget table and a bid table. The lead ping table stores information about a ping (a conditional bid for a particular type of lead that fits certain parameters) and may include an Object ID field, a Seller Campaign ID field, a Lead Type field, a Last Name field, a Phone Suffix field, a Zip Code field, Type-Specific Field Values fields, a Generated Timestamp field and a Minimum Payout field. The lead post table that stores information about a lead that has been posted for sale by a Lead Seller and may include an Object ID field, a Ping ID field, a Seller Campaign ID field, a Lead Type field, Consumer Contact Information fields, XML Type-Specific Field Values, a Generated Timestamp field and a Posted Timestamp field. The buyer campaign ping table stores information about one or more ping campaigns (described below) for one or more Lead Buyers and may include an Object ID field, a Buyer Campaign ID field, a Lead Type field, a Last Name field, a Phone Suffix field, a Zip Code field, Type-Specific Field Values fields and a Generated Timestamp field. The budget table stores information about a budget for either a buyer campaign or a lead buyer account and may include an Object ID field, a Level field, a Level ID field, a Dollar Amount field, a Number of Leads field and a Timeframe field. The budget may specify the maximum number of leads and/or the maximum amount of money to spend on leads during one or more time periods and the budget may be associated with a particular buying campaign or with a particular Lead Buyer account. Because the balances of these budgets will change over time as the Budget timeframes expire or Lead Buyers modify the budget settings, the active auction approach enables these changes to be reflected in the auction outcome, potentially increasing the price paid for a Lead.

The bid table may store the bids from the plurality of Lead Buyers associated with the LMP system and may include an Object ID field, an Auction Thread ID field, a Campaign ID field, an Amount field, a Max Sharing field and Filters Matched fields.

The LMP system shown in FIG. 1 depicts Internet companies that collect, or "Generate" a wide variety of Leads to sell them to one or more Lead Buyers in an auction format. This auction format ensures that a volume of Leads from multiple Lead Sellers is priced and sold efficiently to maximize yield to the Lead Seller while giving control of the Lead purchase to the Lead Buyer. The system uses a unique method to match Leads with Lead Buyers, enabling the Lead Buyer to specify the location, type, characteristics, and quality of Leads they would like to purchase either through a standing order called a "Buying Campaign" or in real-time through a "Live Bidding" user interface. Thus, for a particular lead sold through the LMP, both buying campaigns (pre-set by one or more Lead Buyers) as well as the live bidding (by the same Lead Buyers with the buying campaigns or other Lead Buyers) may occur so that each lead is priced and sold efficiently. Thus, rather than simply selling the Lead based on information that is stored in the system, the LMP creates an Active Auction process that runs for a defined period of time and allows other means of participating in the auction. Like many auction-based system the LMP determines to which Buyer to sell the Lead based on which Buyer or combination of Buyers that offers the highest price.

Each buying campaign is set up by a Lead Buyer (where each Lead Buyer can have one or more buying campaigns) and allows the Lead Buyer of that buying campaign to specify certain parameters that are used to identify leads that are of interest to the particular Lead Buyer as well as selecting the method for entering the Lead Buyer's bid into each lead auction. For example, the buying campaign enables the Lead Buyer to: 1) specify the price and budgets for buying Leads in a "Fixed Buying Campaign"; and/or 2) provide instructions for the LMP system to make a server-to-server request for a price the Lead Buyer is willing to pay for each Lead that enters the system in a "Ping Buying Campaign". This Ping Buying Campaign is useful since many Lead Buyers will have systems through which they will resell the Lead to another Buyer. Thus, the Ping Buying Campaign allows the Lead Buyer, through their servers, to receive a notification that a lead matches the ping buying campaign parameters, to check for demand for the Lead in their system prior to committing to a price to pay to acquire the Lead, and then to provide a bid for the Lead in response to the notification.

The LMP system 20 enables the simultaneous pricing of a lead to different numbers buyers who will "share" the lead, and then the LMP system sells the lead to the group of buyers who generate the highest revenue for a lead. The LMP associates bid with each campaign, and each bid specifies a dollar amount and maximum number of other buyers to share the lead with (the "Sharing Field"). There can be a plurality of bids associated with one buyer campaign, each with a different sharing level. To allow the sharing, Lead Buyers do not need to do anything other than specify how much they are willing to pay for a maximum level of sharing, and the system groups these bids together. The sharing fields above allow the LMP system to support multiple levels of sharing and multiple bids from a single Lead Buyer. For example, one embodiment of the invention might have a user interface that enables a Lead Buyer to create a buyer campaign that specifies a bid of $20 if there is no sharing, $17 if the lead can be shared with one other buyer, $14 if the lead can be shared with two other buyers, etc so that the LMP system can be set up to allow a Lead Buyer to enter different bid amounts for leads to be shared amongst a maximum of 1, 3, 5, 6, or 10 Lead Buyers. The LMP system user interface dictates what values can be entered for sharing by an individual Lead Buyer, but the backend system will clear leads to the group of Lead Buyers that generate the highest return based on any sharing value bid that is in the system. Depending on how the Lead Type is set up in the system (e.g., the amount of sharing that is allowed for the particular lead type, such as sharing with a maximum of two buyers for automobile leads or sharing with a maximum of 4 buyers with mortgages), the user interface controls what can be entered by the Lead Buyer. At any time, the LMP system provides complete flexibility in the number of buyers that can be grouped together and compared to determine the highest value group of buyers. In other words, the LMP system will process whatever sharing level has been saved in the system (theoretically every single sharing increment up to thousands is supported), supporting any user interface design for controlling the Lead Buyer input of bids for sharing levels.

Since many Lead Sellers have systems used to manage the Leads that they generate, the LMP system supports multiple methods for entering Leads into the system for Sale. As shown in FIG. 1, Lead Sellers can set up their HTML Web forms to be submitted to the LMP directly by the customer. In addition, Lead Sellers that collect Leads and save them on their own systems that can send the Leads to the LMP system in a server-to-server exchange called a Server Post. The LMP system also makes it easier for Lead Sellers to Post Leads to the system by allowing them to map the fields in their tables to the fields in the LMP system for each Lead Type. By so doing, the LMP system eliminates the need for the Lead Seller to make significant modifications to their data structures in order to sell their Leads.

Since Lead Sellers may have established relationships with multiple partners that buy Leads, the LMP allows Lead Sellers to make a server-to-server request for a payout quote prior to selling the Lead through the LMP. This type of price quote request is called a "Ping", and it contains enough information about the Lead to enable the LMP to run an Active Auction on the Lead, without including enough information to enable the LMP to actually sell the Lead. If the Lead Seller system determined that the payout amount is acceptable, the system can then complete a Server Post of the Lead.

Different Lead Sellers use different techniques in generating Leads. As a result, the ease with which the resulting Lead can be turned into a customer varies from one Lead Seller to another. The measure of the ease with which a Lead can be converted to a customer is referred to as the "Quality" of the Lead. Differences in Quality affect the value of the Lead to the Lead Buyer. The LMP uses a unique combination of measures to establish a Quality Rating for each Lead entered into the system. The LMP combines three factors to calculate a real-time Quality Rating for each Selling Campaign in the LMP: 1) ratings provided by the Lead Buyers, 2) A rating from a third-party validation service, and 3) The results of a survey of the customer. Any Lead that enters the system is associated with one Selling Campaign and inherits the Quality Rating of that Selling Campaign. Rather than tie these Quality Ratings to the Lead Seller account directly, the LMP uses the Selling Campaign system object to enable one Lead Seller to deliver Leads of varying quality.

Once a Lead is sold, the LMP creates "Lead Leg" records in the lead leg table for each of the Lead Buyers. These Lead Leg records are associated with the Lead, which is associated with the Selling Campaign, which is associated with the Seller Account. The Lead Buyer accesses his or her own Lead Leg in the LMP, and the Buyer Rating, entered by the Lead Buyer through the LMP Buyer user interface, is stored in the Lead Leg record. Now, the Lead Buyer campaign creation and Lead Seller campaign creation are described in more detail.

Figure 2:
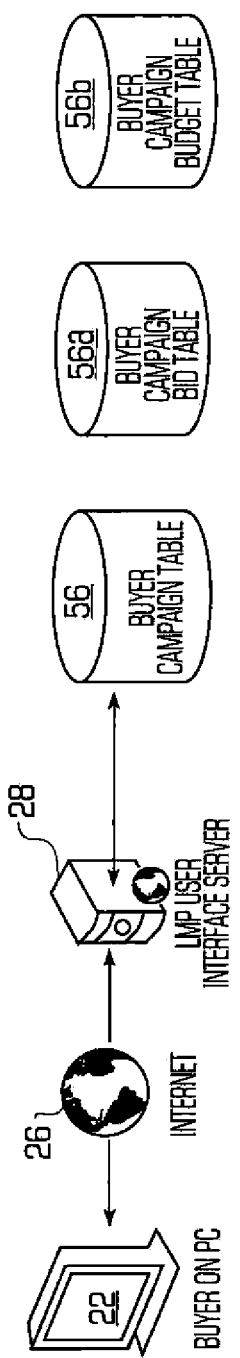
FIG. 2 illustrates an example of a Lead Buyer campaign creation workflow implemented in the lead marketplace system shown in FIG. 1.
Figure 3:
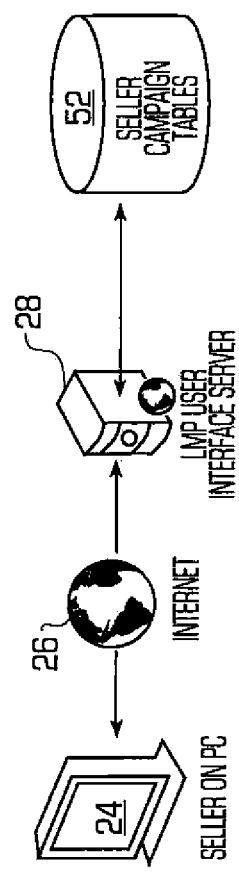
FIG. 3 illustrates an example of a Lead Seller campaign creation workflow implemented in the lead marketplace system shown in FIG. 1.

FIG. 2 illustrates an example of a Lead Buyer campaign creation workflow implemented in the lead marketplace system shown in FIG. 1, and FIG. 3 illustrates an example of a Lead Seller campaign creation workflow implemented in the lead marketplace system shown in FIG. 1. As shown in these figures, a Lead Buyer or Lead Seller can, using the link 26, access the LMP user interface unit 28 and create a new lead buying campaign that is stored in the buyer campaign table 56, the buyer campaign bid table 56a and the buyer campaign budget table 56b, or create a new lead selling campaign that is stored in the seller campaign table 52, respectively. In one embodiment, the Lead Buyer or Lead Seller can access the LMP system using a typical Web browser application by entering the appropriate user identified and password. The LMP system presents the Lead Buyer with a series of pages that enable the Lead Buyer to specify (as shown in FIG. 2) the type of Lead to purchase, the location of the Lead, the characteristics of the Lead, the bidding method (fixed versus Ping), the bids (including the max sharing number and/or bid amount) and the Budgets in dollar amount and number of Leads for different timeframes. The LMP system presents the Lead Seller with a series of pages that enable them to specify the method they are using to capture Leads and associate the data with a seller account ID, a campaign ID as shown in FIG. 3.

Based on the Lead Type selected when creating a Buying Campaign, the Lead Buyer will be presented with the relevant lead characteristics that are associated with that type of leads. For example, if the Lead Buyer is purchasing Plumbing Service Leads, he or she might be asked to specify the type of job requested and whether it is for emergency service. If the Lead Buyer is purchasing Mortgage Service Leads, he or she might be asked to specify the loan amount and type of home among other mortgage-related criteria. The LMP has a Lead Type Table that stores the appropriate data schema and selection values for each type of Lead.

Figure 4:
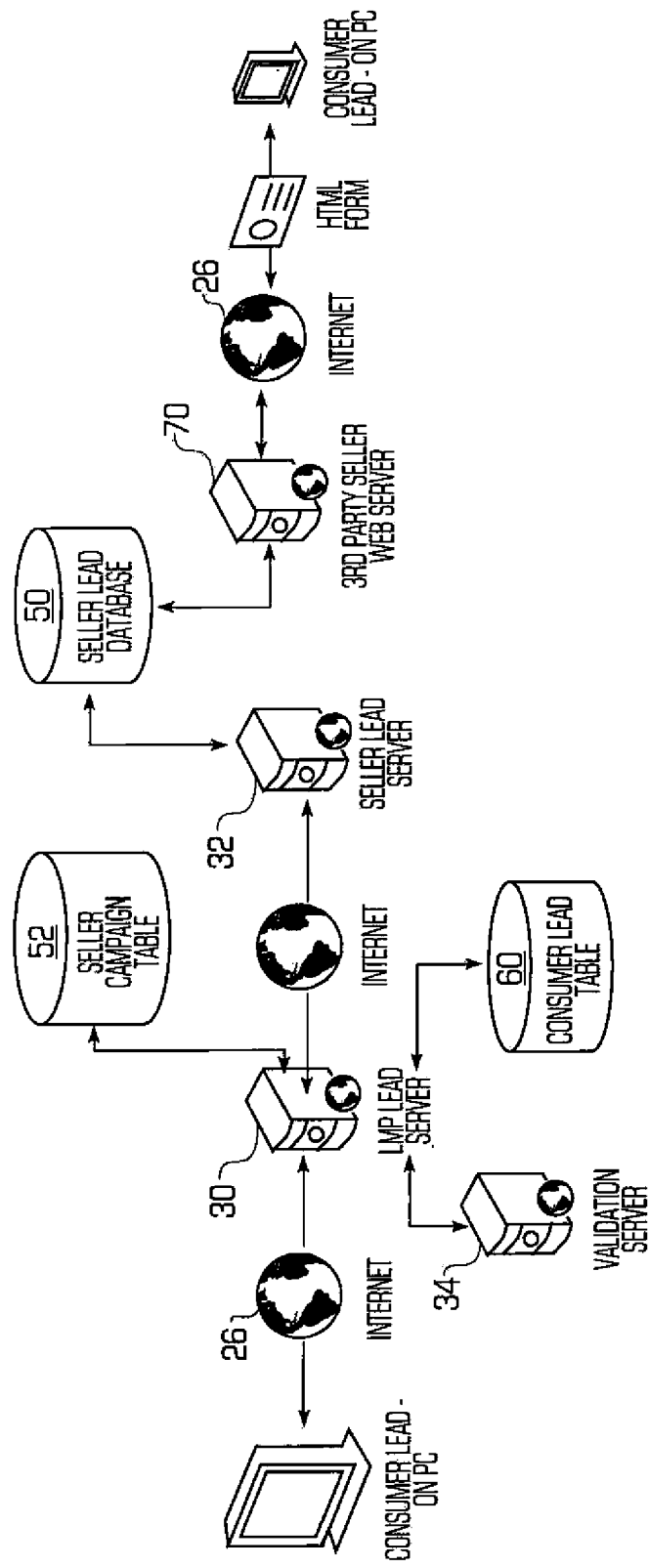
FIG. 4 illustrates an example of a lead upload workflow implemented in the lead marketplace system shown in FIG. 1.

FIG. 4 illustrates an example of a lead upload workflow implemented in the lead marketplace system shown in FIG. 1. There are two main methods used by Lead Generators to enter, or "Post", Leads into the LMP system including: 1) direct posting in the LMP system and 2) delivering leads from the third party leads database. In the direct posting method, a customer on a computing device can access the an HTML Web page that collects the appropriate lead information and performs an HTTP Post directly to the LMP (the LMP lead unit 30). The lead Generators can create the form themselves or make a request to the LMP system to serve a lead collection form to the customer for them. Alternatively, the Lead Generator can collect the Lead information themselves (using their own third party seller Web server 70 which is accessed by the customer over the link), and then the Lead Generator can store the information in their own database system. Once they have stored the Lead, the Lead Generator can use one of several methods to Post the Lead to the LMP system through a server-to-server connection, for example, through an HTTP POST or a Web Service. Prior to Posting the Lead to the LMP system, the Lead Generator has the option to send a pricing request for the lead called a "Ping" wherein the lead generator sends a limited amount of information about the Lead to the LMP to determine the payout they will receive for the Lead. Then, based on the response from the LMP, the Lead Generator can decide whether or not to Post the Lead to the LMP for sale.

Figure 5:
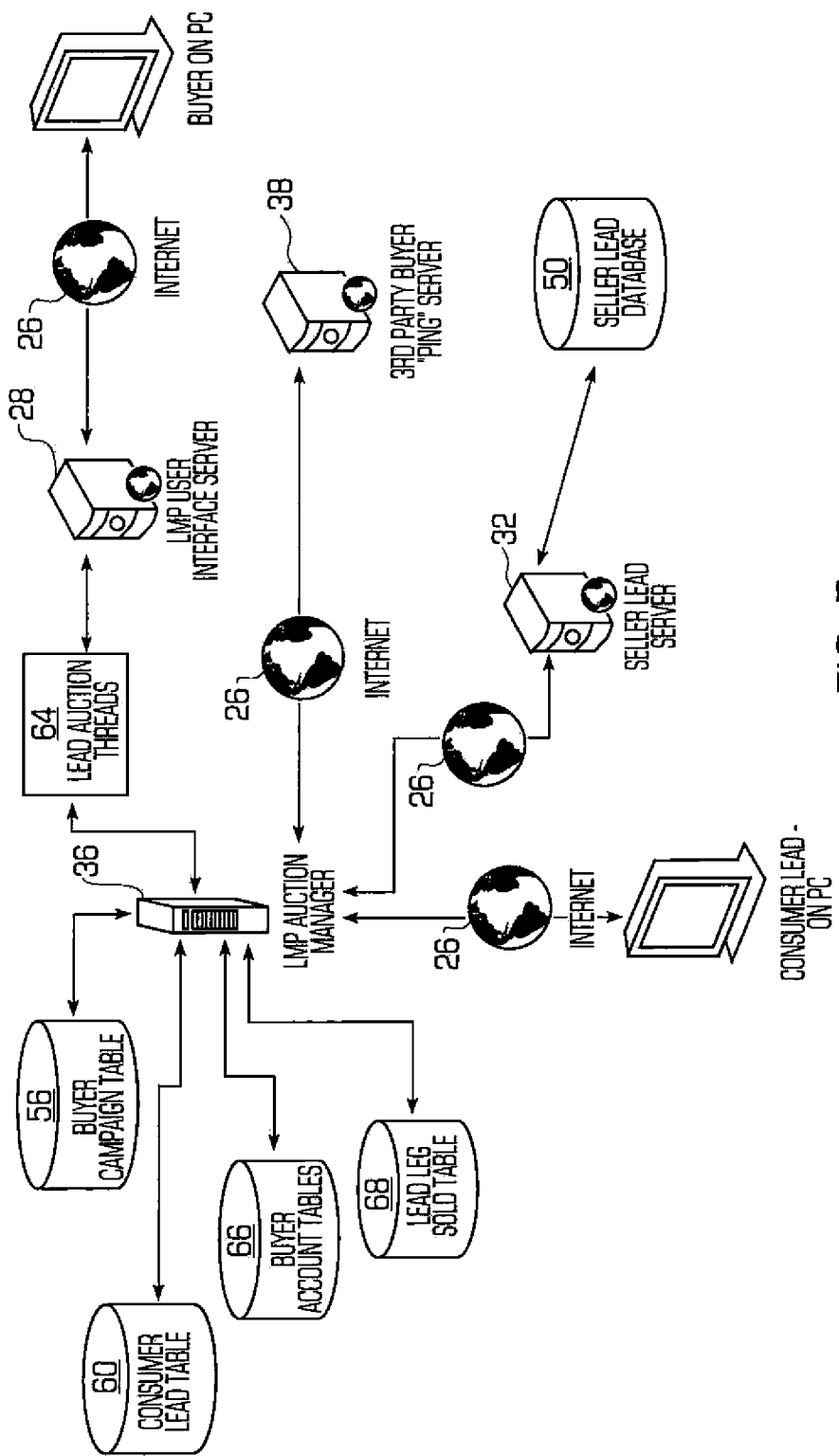
FIG. 5 illustrates an example of a lead auction workflow implemented in the lead marketplace system shown in FIG. 1.
Figure 6:
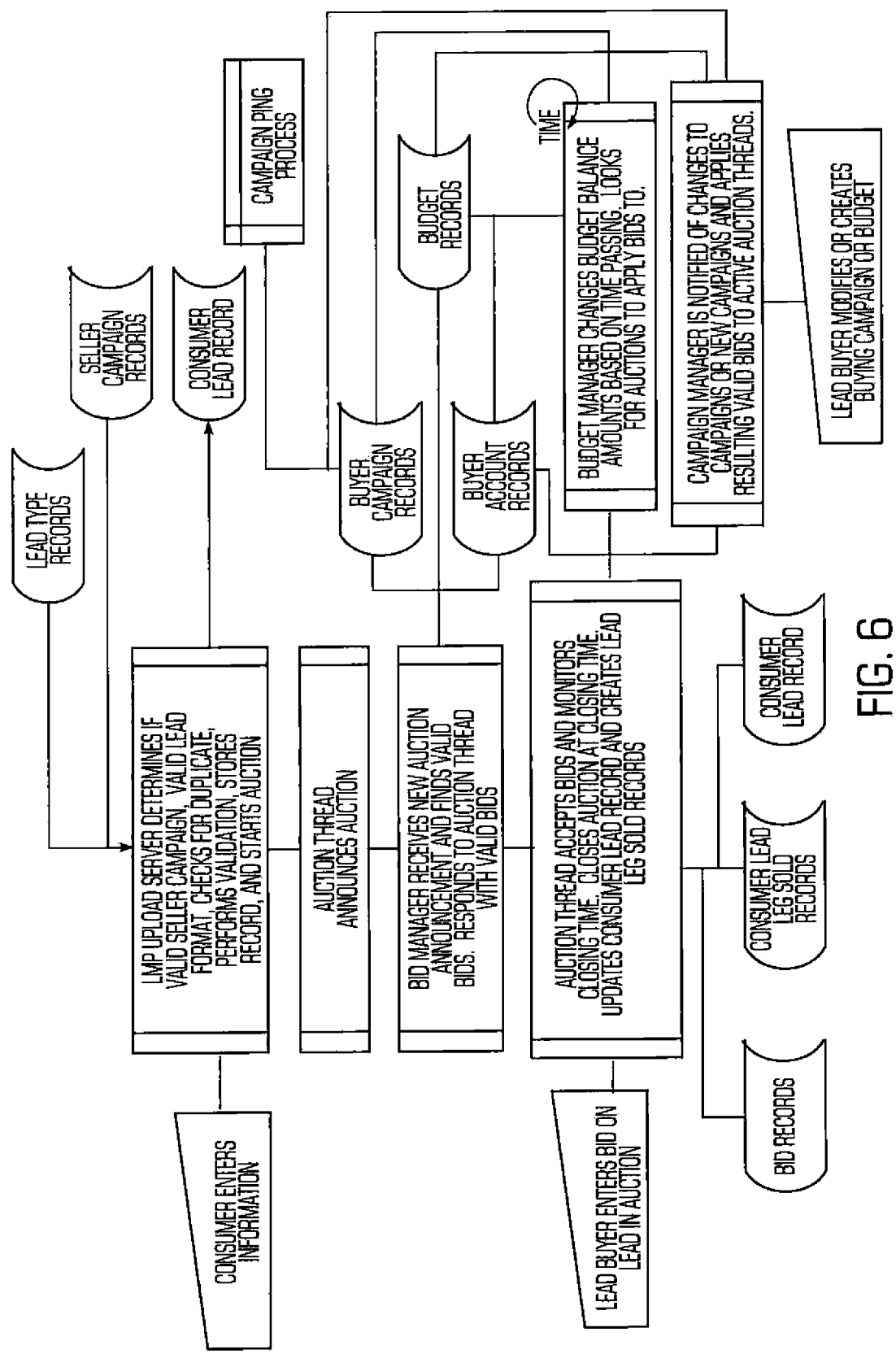
FIG. 6 illustrates an example of an auction workflow implemented in the lead marketplace system shown in FIG. 1.
Figure 7:
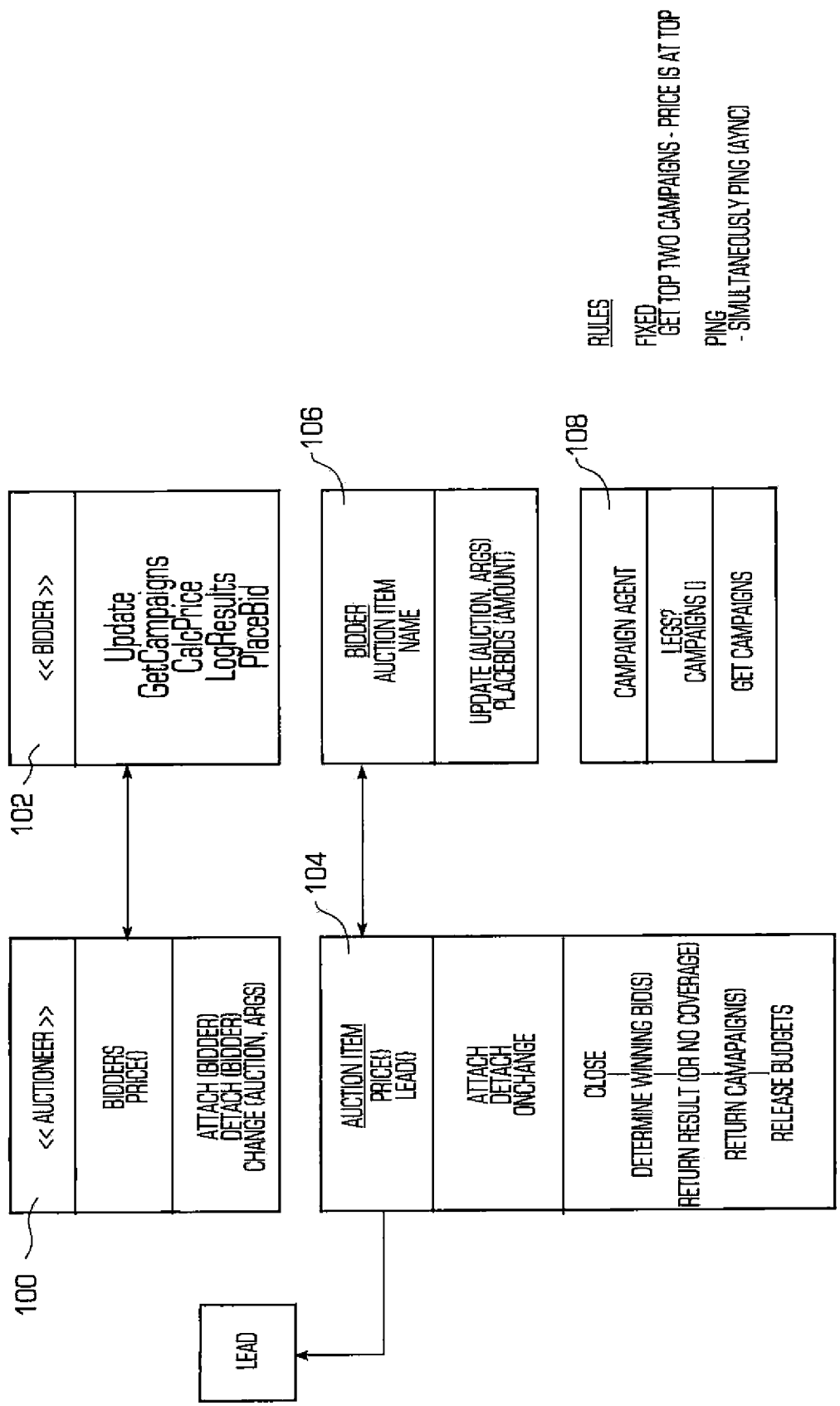
FIG. 7 illustrates an example of auction logic in the lead marketplace system shown in FIG. 1.
Figure 8:
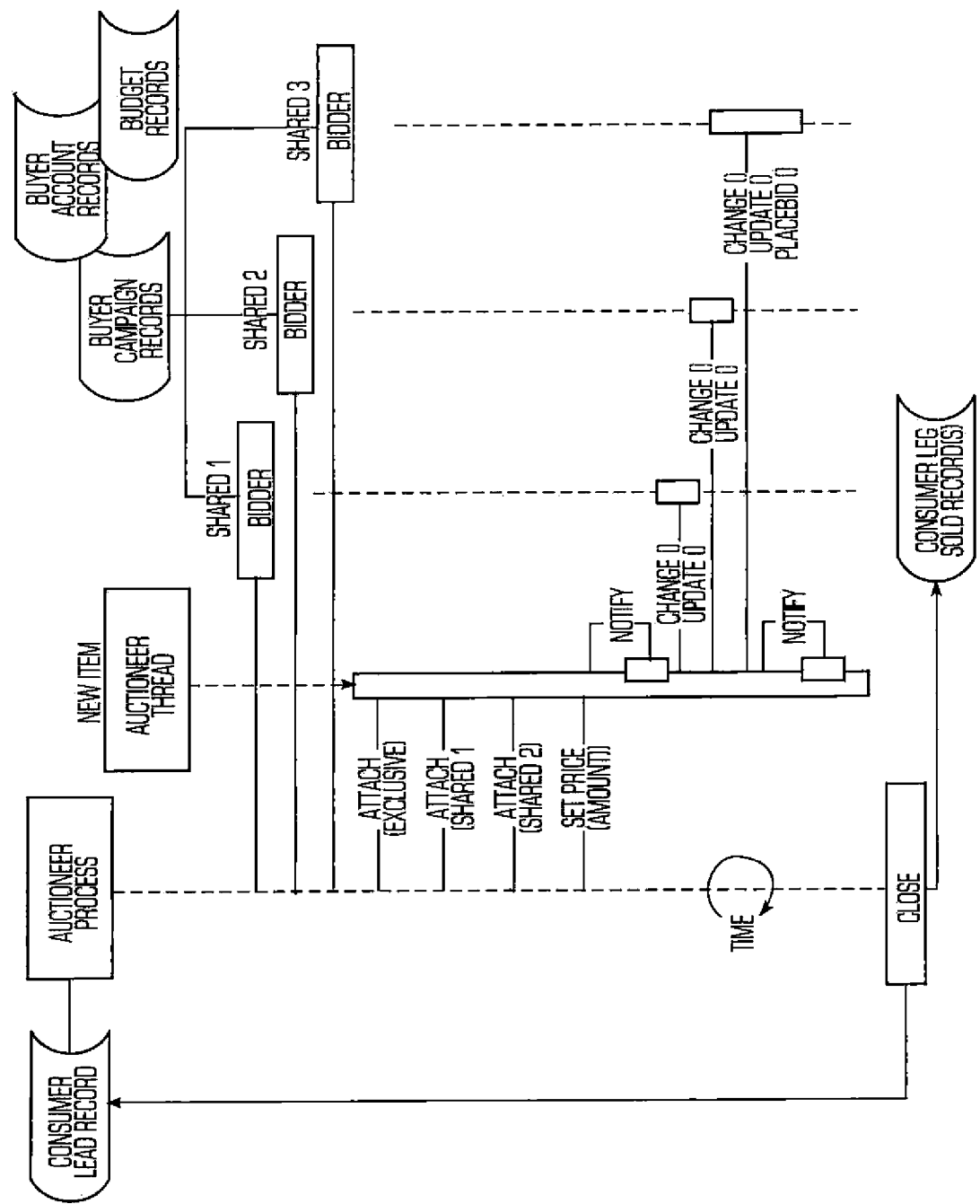
FIG. 8 illustrates an example of an auctioneer process system function flow implemented in the lead marketplace system shown in FIG. 1.

FIG. 5 illustrates an example of a lead auction workflow implemented in the lead marketplace system shown in FIG. 1. In addition, FIG. 6 illustrates an example of an auction workflow implemented in the lead marketplace system shown in FIG. 1, FIG. 7 illustrates an example of auction logic in the lead marketplace system shown in FIG. 1 and FIG. 8 illustrates an example of an auctioneer system function flow implemented in the lead marketplace system shown in FIG. 1.

The LMP system has an "Auctioneer" process that creates an auction process ("Auction Thread") for each individual Lead Ping (a proposal to post a lead if there is sufficient demand) or Post (a lead for sale) received from a valid Seller Campaign. This Auction Thread 64 receives bids from the "Bid Manager", "Budget Manager", or "Campaign Manager" processes and identifies the set of Lead Buyers who will purchase the Lead, calculates the amount of money to be paid to the Lead Seller, and creates Lead Leg Sold records for each Lead Buyer. The Auction Thread is an individual process within the LMP Auction Manager subsystem that runs for a defined amount of time, which may be different for each Lead, accepting all bids for the Lead during the timeframe.

Rather than simply doing a database query of the Buyer Campaigns to determine the highest bidder or group of bidders and awarding the Lead based on the database query results, the LMP Auction first queries the Buyer Campaigns that match the characteristics of the Lead to get their bids for each level of sharing. There is a separate "Sharing Bid Thread" created for each level of sharing that has a bid in the system. Each of these individual Sharing Bid Threads manages the initial and subsequent bidding activity for the level of sharing for the Auction Thread.

The Auction Thread, through its Sharing Bid Threads allows Lead Buyers or Buyer Campaigns to place bids into the Auction Thread, where they are processed by the appropriate Sharing Bid thread and the Auction Thread. As changes to the Auction Thread occur, the Auction Thread sends out notifications to all Campaigns that are participating in the auction, letting them know the current status of the auction and allowing them to submit new bids.

The benefit of this approach is that in addition to including bids from Campaigns that qualify at the moment the Lead enters the LMP, the Auction Thread can accept qualifying bids that come into the system after the Lead has entered the LMP. For example, if a Buyer Campaign had a budget limit that had been exceeded when a Lead initially entered the LMP, but the Buyer increased the budget before the Auction Process ended, the Budget Manager within the LMP would be able to submit the bid to the Auction Thread. As another example, if a Lead Buyer added a new Buying Campaign or modifies an existing Buying Campaign so that it matches the characteristics of Leads with active Auction Threads, the Campaign Manager would apply the bids from these Campaigns to those active Auction Threads rather than waiting until a new Lead entered the system to apply the Campaign bid to a Lead.

In addition, this method of running the auction allows for "Ping Buying Campaigns", where the Lead Buyer's bid is set through a server-to-server process. This method also allows for live bidding by Buyers for individual Leads with active Auction Threads. This active method of managing the auction of a Lead gives the system the flexibility to take advantage of the entire window of time over which a Lead can be sold to increase the number of bids that can be applied.

The system can be set up to use a different model from the Threaded "Listener" model described herein. The LMP system encompasses any system that creates a process that runs for a duration of time and can use a combination of 1.) Queries from static "Purchase Order" or "Bidding" objects that specify lead characteristics, prices offered and budgets; 2.) Changes to the Purchase Order or Bidding objects that change their participation status in currently active auctions; 3.) Changes to the budget position of the buyer's account; 4.) server-to-server requests for a bid on a specific Lead; or 5.) Live bids entered into the system by Buyers as shown in FIG. 6.

FIG. 7 illustrates the auction logic when implemented in software using one or more objects and database tables. The auction logic may include an auctioneer object 100 for each auction thread and a bidder object 102 wherein the auctioneer object tracks the bidder threads for the particular auction thread and the bids offered by those bidders and can perform the functions of attaching (adding) a new bidder thread, detaching (removing) a bidder or changing the auction parameters or arguments. Each bidder thread object is associated with each bid level in existence in an auction and can perform the functions of update (when information about a bid at that level is updated), GetCampaigns to find qualifying seller campaigns that might have valid bids that might apply to the bidder thread, CalcPrice to calculate the aggregate price to be offered by the bidder thread for a particular auction, LogResults to store the results for the current auction for the bidder thread and PlaceBid to place a bid into the auction thread. The auction logic may also include an auction thread 104, a bidder thread 106 and a campaign agent 108. The auction thread item may be an object associated with a particular lead that performs the functions of attach, detach or onchange and, when the auction is completed/closed, the auction thread item determines the winning bid(s), returns the results (or no coverage), returns the Buyer campaign identifier(s) and release budgets that were not associated with the winning bids. The bidder thread item 106 is associated with a particular auction thread item and can perform updates and place bids for a particular amount. The system function flow of a typical auction is shown in FIG. 8.

Figure 9:
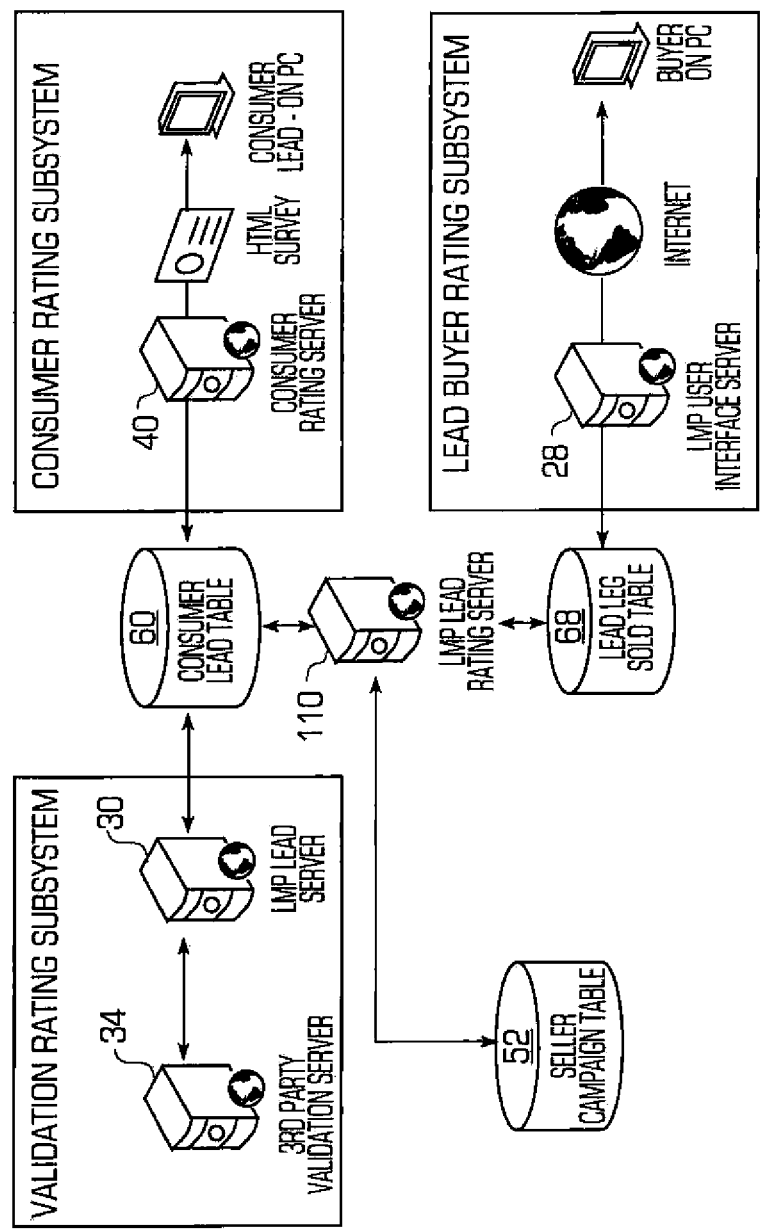
FIG. 9 illustrates an example of a lead rating workflow implemented in the lead marketplace system shown in FIG. 1.

FIG. 9 illustrates an example of a lead rating workflow implemented in the lead marketplace system shown in FIG. 1. The LMP system runs a Lead Rating subsystem to track the quality of Leads that are Posted under each Selling Campaign. There is a current rating, associated with each Selling Campaign ("Campaign Rating"), that is inherited by each Lead that is Pinged or Posted as part of the Selling Campaign. The Campaign Rating value is calculated as shown in FIG. 9 using three data points; 1.) the rating by the Lead Buyer(s), 2.) the results of a validation check against a database of customer information, and 3.) a survey of the end customer. The LMP Lead Rating subsystem performs an algorithm to calculate the Campaign Rating, which is the weighted average rating of Leads that have been sold associated with each Selling Campaign. The Campaign Rating is sent through the Auctioneer Thread to the Auction Thread when a Lead is auctioned, enabling the LMP to allow Buyers to specify the minimum quality rating of Leads they would like to buy.

Figure 10:
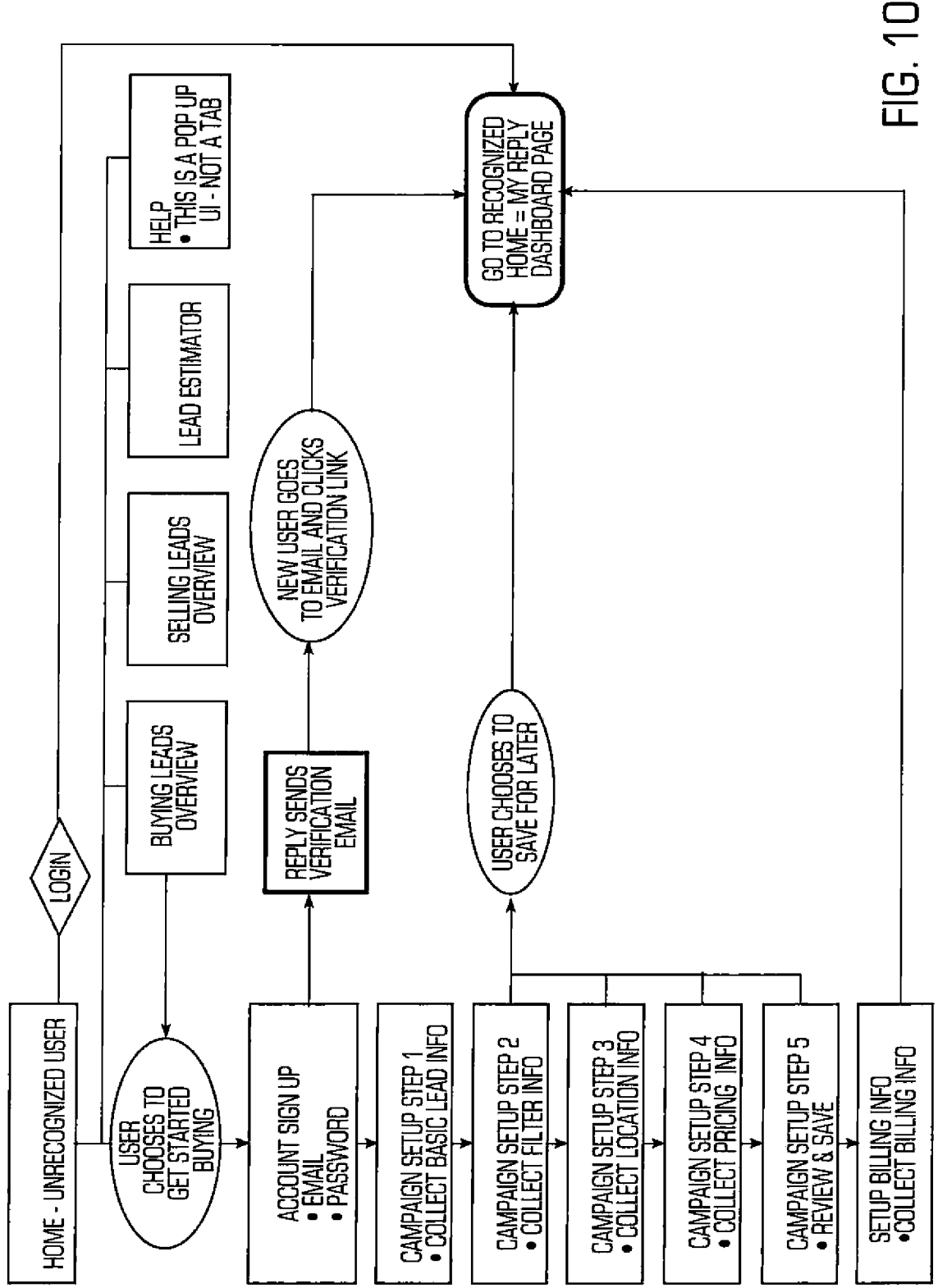
FIG. 10 illustrates an example of a buyer information workflow implemented in the lead marketplace system shown in FIG. 1.
Figure 11:
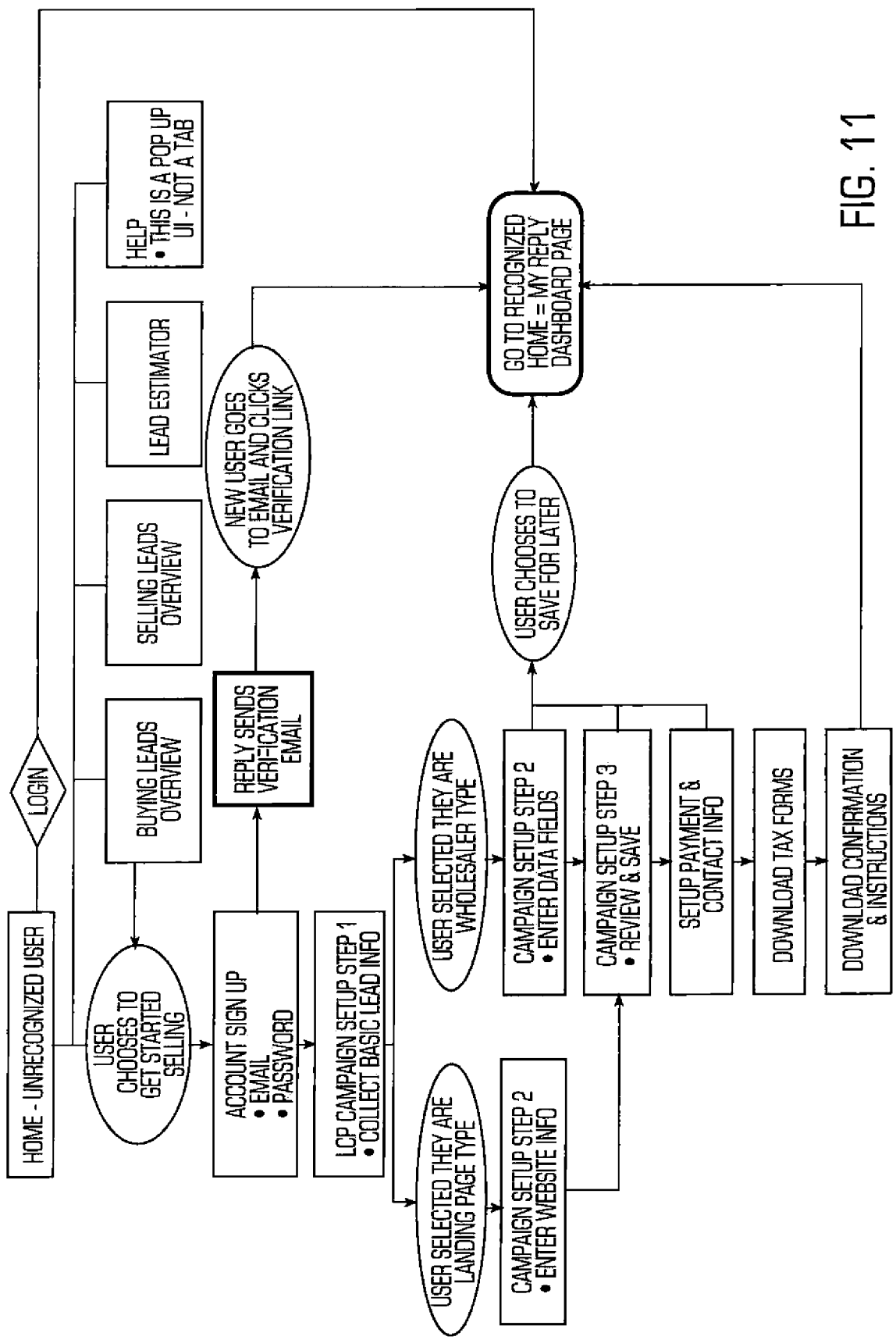
FIG. 11 illustrates an example of a seller information workflow implemented in the lead marketplace system shown in FIG. 1.

FIG. 10 illustrates an example of a buyer information workflow implemented in the lead marketplace system shown in FIG. 1 and FIG. 11 illustrates an example of a seller information workflow implemented in the lead marketplace system shown in FIG. 1. These diagrams show the workflow for a buyer to enter information into the LMP system and the workflow for the seller to enter information into the LMP system, respectively.

Figure 13:
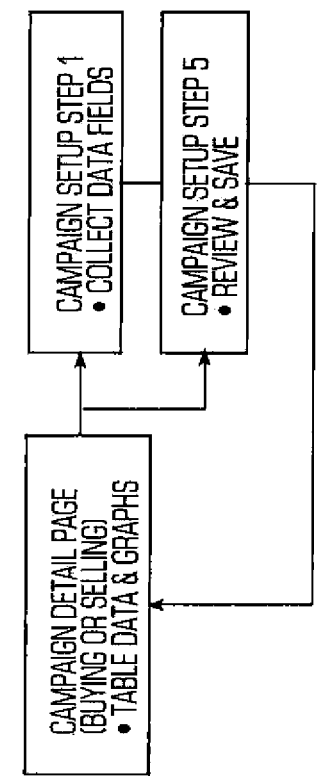
FIG. 13 illustrates an example of a selling campaign management workflow implemented in the lead marketplace system shown in FIG. 1.
Figure 12:
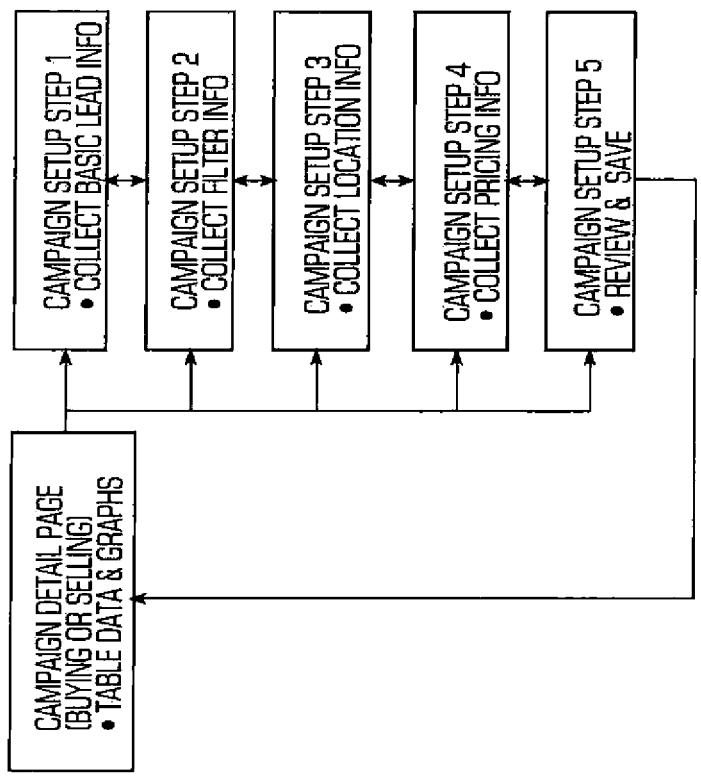
FIG. 12 illustrates an example of a buying campaign management workflow implemented in the lead marketplace system shown in FIG. 1.

FIG. 12 illustrates an example of a buying campaign management workflow implemented in the lead marketplace system shown in FIG. 1 and FIG. 13 illustrates an example of a selling campaign management workflow implemented in the lead marketplace system shown in FIG. 1.

Thus, a lead marketplace system and method are provided that include a storage system that stores a plurality of Leads wherein each Lead is electronic contact and transactional information that provides someone with an opportunity to sell a good or service to a prospective customer and a Lead Seller unit that stores one or more selling campaigns for one or more Lead Sellers, each selling campaign enabling the association of one or more Leads to be sold in the lead marketplace system and a Lead Buyer unit that stores one or more buying campaigns for one or more Lead Buyers, each buying campaign including one or more parameters specifying the characteristics of leads to be bought by the Lead Buyer associated with the buying campaign. Each buying campaign has one or more bids associated with the buying campaign wherein each bid specifies the amount offered by the Lead Buyer for a specific level of sharing. The buying campaign also has one or more budgets associated with each buying campaign wherein each budget specifies a maximum dollar amount to spend and/or the maximum number of leads to purchase in a specified timeframe. The lead marketplace system and method also has an auction manager that performs a time period limited auction for each Lead entered into the system for sale by a Lead Seller to one or more Lead Buyers and the auction manager has a lead auction thread for each Lead that sets a time period for an auction of each Lead associated with the selling campaign, that accepts bids from the one or more Lead Buyers through several means, and that sells leads associated with the selling campaign to the group of Lead Buyers that generates the greatest amount of money. The lead marketplace system and method also has a budget manager that ensures that individual Lead Buyers or individual buying campaigns do not have their bids applied to lead auctions if so doing would risk exceeding one or more budget rules entered by the Lead Buyer, a campaigns manager that submits bids associated with each buying campaign to each relevant lead being sold, and a bids manager that submits bids stored in buying campaigns, submitted in association with a buying campaign by a third-party system, or entered directly through a computing device by a Lead buyer.

The lead auction thread of the lead marketplace system and method may also receive bids from one or more buying campaigns and receive live bids from one or more Lead Buyers. The one or more bids associated with each buying campaign may have a sharing parameter that specifies a level of sharing the leads being sought in the buying campaign, with or without a system limit on the numerical sharing level that can be assigned to the bid. The one or more bids of each buying campaign may also specify a bid price representing the amount of money the Lead Buyer is willing to spend. Alternatively, the bid price can be requested at the time of the auction of an individual lead through a process termed a "Ping" in which a server-to-server request is sent to a computer device under the Lead Buyer's control, such request including information about the location and type of the lead, and a response is sent back to the system with a dollar amount the Lead Buyer is willing to bid. The response in the "Ping" may also include the sharing level of the bid returned. The response in the "Ping" also may include multiple bids, each bid with a different sharing level specified. In the lead marketplace system and method, a process in the system receives the "Ping" response and places the bid into the appropriate sharing level thread.

The one or more budgets in the lead marketplace system and method may be associated with each buying campaign or each Lead Buyer account and the budgets include a maximum monetary amount and/or a maximum number of leads, for the leads to be bought within a specified timeframe. The selling campaign unit may include a mapping unit that associates fields in a third party Lead into fields in the storage system of the lead marketplace system and method.

In the lead marketplace system and method, the Lead Auction unit creates an individual auction process for each lead that is submitted to the system with a defined start and stop time during which bids from one or more buyers are evaluated to determine how to sell the lead. Each individual auction process creates one or more sharing bid threads to accept bids for different levels of sharing, such sharing bid threads to be used to create and update an aggregate bid amount for the particular level of sharing to be compared against the aggregate bid amounts of the other sharing levels in determining how to sell the lead. The multiple auction processes can enter bids on behalf of a Lead Buyer into one or more active sharing bid threads and the bids are included in a determination of how to sell the lead. The multiple auction processes are able to enter bids on behalf of a campaign manager that accepts changes to buying campaigns, a budget manager that monitors changes to budgets based on time passing or other buying campaign activity, or a bid manager that accepts live bids from Lead Buyers through a user interface device. In the lead marketplace system and method, the selling campaigns are assigned a current rating value by the system, such rating value being calculated through a combination of data collected from a results of a comparison of lead information to a customer information database, the rating values assigned to the lead by the Lead Buyers, and the results of a survey of the customer who entered the lead. The current rating value associated with a selling campaign is inherited by each lead as it is entered into the system for auction and sale, such rating then being used for the purpose of determining which buying campaigns qualify for bidding on the lead.

Figure 14:
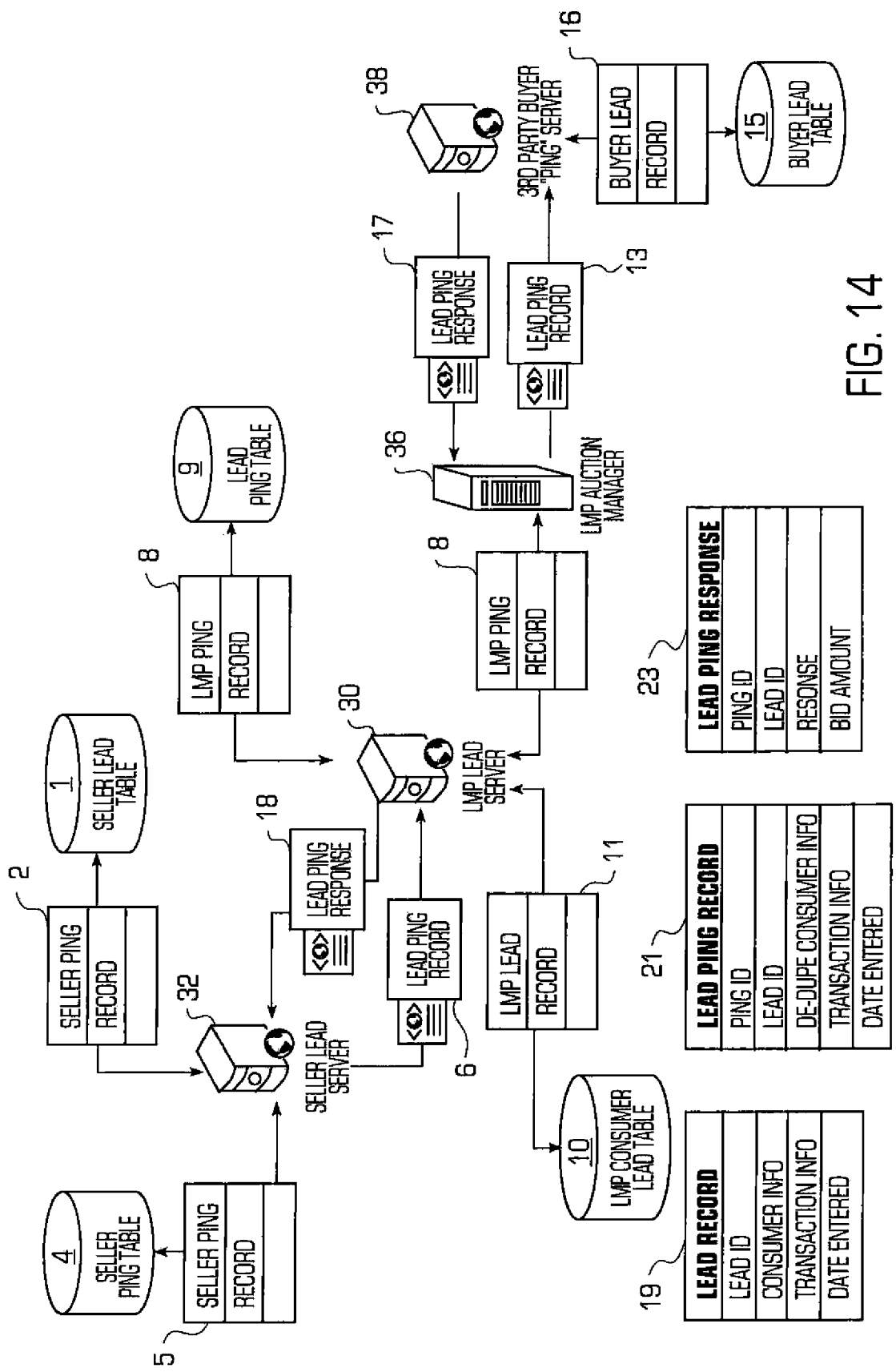
FIG. 14 illustrates a ping campaign duplication detection process workflow of the implemented in the lead marketplace system shown in FIG. 1.

FIG. 14 illustrates a ping campaign duplication detection process workflow of the implemented in the lead marketplace system shown in FIG. 1. The ping campaign duplicate detection process may be carried out, in one embodiment, by the LMP lead unit 30 shown in FIG. 1 (for the incoming leads) and by the third party Buyer Ping Unit 38 (for the leads being offered to buyers). Those portions of the LMP lead unit 30 and the third party Buyer Ping Unit 38 may be collectively a lead duplication detection unit. In the workflow, a third-party lead seller stores leads in a table 1 in a lead record 2 with a format 19 that contains a lead identifier, consumer information, transaction information, and the date the lead was entered by the consumer. The Seller Lead Unit 32 creates and stores in the Seller Ping Table 4 a Ping Record 5 with a format 21 that contains a ping identifier, lead identifier, de-dupe consumer information, transaction information, and the date entered. The de-dupe consumer information may be one or more pieces of information that allow the system to uniquely identify each ping campaign. For example, the de-dupe consumer information may be two or more pieces of information about the consumer (zip code and last four digits of social security number, etc.), a hash of the relevant consumer information, a globally unique identifier, etc.

The Seller Lead Unit 32 also creates and transmits over a network a Lead Ping Record 6 containing the Lead Ping information 21 to the LMP Lead Unit 30, which creates its own version of the Lead Ping Record 8. For each lead ping, the LMP Lead Unit 30 searches the LMP Lead Table 60 using the Transaction Info, De-Dupe Consumer Info, and Date Entered to see if there is a LMP Lead Record with matching information. If there is an LMP lead record 8 already in the LMP system with matching information, the Lead Ping is identified as being a duplicate to one already entered in the system and the system handles it according to the business rules for duplicate lead submissions. For example, there might be a rule that the duplicate leads will not be accepted into the system and that an error message will be returned to the lead Seller, or there might be a rule that duplicate leads will be accepted into the system, but not sold to the same Buyer as the initial Lead. If there is not an LMP lead record 8 already in the LMP system with matching information, then the LMP Lead Unit 30 can send the Lead Ping Record 8 to the LMP Auction Manager 36 for processing, at which time the LMP Auction Manager 36 can create and send a Lead Ping Record 13 across a network to the $3^{rd}$ Party Buyer Ping Unit 38. The $3^{rd}$ Party Buyer Ping Unit 38 searches a Buyer Lead Table 15 using the Transaction Info, De-Dupe Consumer Info, and Date Entered to see if there is a Buyer Lead Record already in the system with matching information. If there is a Buyer lead record already in the system with matching information, the Lead Ping is identified as being a duplicate to one already entered into the system and the system handles it according to the business rules for duplicate lead submissions. For example, there might be a rule that the duplicate leads will not be accepted into the system and that an error message will be returned to the lead Seller, or there might be a rule that duplicate leads will be accepted into the system, but not sold to the same Buyer as the initial Lead. If there is not a Buyer lead record already in the system with matching information, then the 3rd Party Buyer Ping Unit 38 responds to the LMP Auction Manager 36 with a Lead Ping Response 17 in a Lead Ping Response Format 23 containing the Ping ID, Response, and Bid Amount which indicates interest in buying the Lead. Based on the results of the auction, the LMP Lead Unit 30 returns a Lead Ping Response 18 to the Seller Lead Unit 32. In this manner, the LMP system described above checks for duplicate leads when entering into the LMP system (a new lead being entered into the system) as well as enabling Buyers to check for duplicate leads within their systems prior to bidding for a lead. The proper handling of duplicate leads (either incoming or outgoing leads) is important to prevent the unintentional sale the same lead multiple times to the same buyer, and to maintain the appropriate level of sharing for the lead.

In summary, the system is able to detect duplicate leads and then allow the system to handle the duplicate lead in one or more different manners (the business rules referred to above.) For example, the situation may be that the duplicate lead occurs the first time that the lead came in and the system already sold two legs so the system may be programmed to decide that even though it is a duplicate, the system will accept it and sell one leg to a different buyer.

Furthermore, once the system detects a duplicate lead, the system may also include a zipback concept that identifies any other buyers of a lead so that a third party does not sell the lead to the same person.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system, comprising:
a computer system having a processor, memory and a plurality of lines of computer code being configured to:
communicate with a storage system configured to store a plurality of leads wherein each lead is an electronic contact and transactional information, wherein each lead has a type, the storage system configured to store a lead ping table, the lead ping table configured to store information regarding a conditional bid for one of a type of lead, wherein the lead ping table includes the following lead ping table data fields, an Object ID field, a Seller Campaign ID field, a Lead Type field, a Last Name field, a Phone Suffix field, a Zip Code field, Type-Specific Field Values fields, a Generated Timestamp field and a Minimum Payout field;
the storage system configured to store a lead post table, the lead post table configured to store information regarding a lead that has been posted for sale by a Lead Seller and includes the following data post table data fields, an Object ID field, a Ping ID field, a Seller Campaign ID field, a Lead Type field, Consumer Contact Information fields, XML Type-Specific Field Values, a Generated Timestamp field and a Posted Timestamp field;
receive a request from a Lead Seller server for a payout quote that contains enough information about the lead to enable an active auction on the Lead, without including enough information to enable the system to complete a sale of the lead;
receive a request for lead information from a Lead Buyer server;
send to the requesting Lead Buyer server at least one of the data fields from the lead post table;
receive bids from Lead Buyer servers for one of the leads from the lead post table;
time stamp the received bids from the Lead Buyer servers for the lead;
compare the time stamps of the received bids to a predetermined window of time for the auction to be open;
compare the received bids to determine a highest bid, if a received bid is determined to be highest and within the predetermined window of time, indicate a good sale to the selling Lead Server.

2. The system of claim 1, wherein the computer system is further configured to receive bids from one or more buying campaigns, wherein each buying campaign is associated with a Lead Buyer, each buying campaign including one or more parameters specifying the characteristics of leads to be bought by the Lead Buyer associated with the buying campaign.

3. The system of claim 1, wherein the computer system is further configured to receive live bids from one or more Lead Buyers.

4. The system of claim 2, wherein each buying campaign further comprises one or more bids wherein each bid has a sharing parameter that specifies a level of sharing of the leads being sought in the buying campaign.

5. The system of claim 2, wherein each buying campaign further comprises one or more budgets wherein each budget has one of a maximum monetary amount for the leads to be bought within a specified timeframe by the Lead Buyer associated with the buying campaign and a maximum number of leads to be bought within a specified timeframe by the Lead Buyer associated with the buying campaign.

6. The system of claim 1, wherein each Lead Buyer has one or more budgets associated with the Lead Buyer wherein each budget has one of a total amount of money budgeted for leads within a specified timeframe by the Lead Buyer and a maximum number of leads to be bought by the Lead Buyer within a specified timeframe.

7. The system of claim 1, wherein the computer system is further configured to map fields in a third party lead into fields in the storage system.

8. The system of claim 1, wherein the computer system is further configured to compare a new lead to the leads stored in the storage system to determine if the new lead is a duplicate.

9. The system of claim 8, wherein each lead further comprises a de-dupe identifier that uniquely identifies each lead and wherein the computer system is further configured to compare the de-dupe identifier of the new lead to the de-dupe identifier for each lead in the storage system to detect duplicate leads and wherein the de-dupe identifier for each lead further comprises one of a set of information about an entity associated with each lead, a globally unique identifier and a hash of the electronic contact and transactional information of each lead.

10. The system of claim 1, wherein the computer system is further configured to compare a lead being sent to a Lead Buyer with a set of leads already purchased by the Lead Buyer to determine if the sent lead is a duplicate and wherein each lead further comprises a de-dupe identifier that uniquely identifies each lead so that the de-dupe identifier of the new lead is compared to the de-dupe identifier for each lead in the storage system to detect duplicate leads and wherein the de-dupe identifier for each lead further comprises one of a set of information about an entity associated with each lead, a globally unique identifier and a hash of the electronic contact and transactional information of each lead.

\* \* \* \* \*